Jan. 19, 1937.                C. BROWN                2,068,481
PUMP VALVE
Filed May 16, 1932
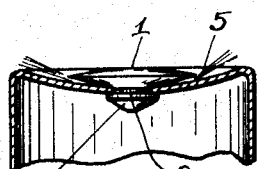
Fig-2-
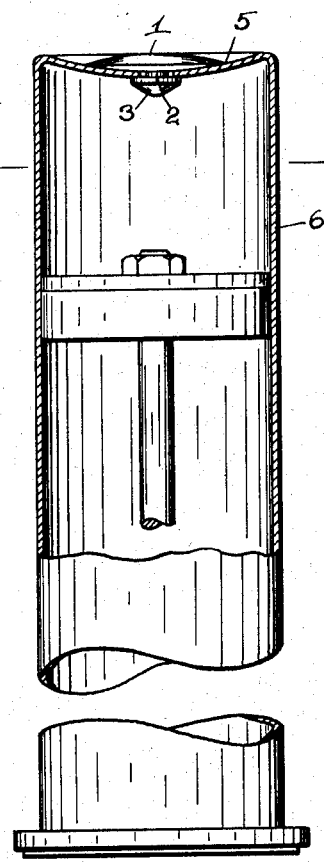
Fig-1-
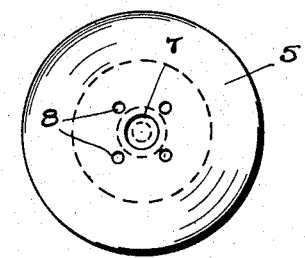
Fig-3-
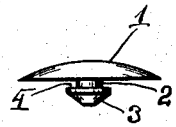
Fig-5-
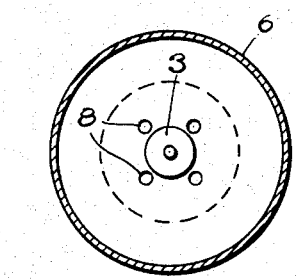
Fig-4-
INVENTOR
COLIN BROWN
BY Eric Schinger.
ATTORNEY Patented Jan. 19, 1937

2,068,481

UNITED STATES PATENT OFFICE 2,068,481

PUMP VALVE

Colin Brown, Rochester, N. Y.

Application May 16, 1932, Serial No. 611,497

7 Claims. (Cl. 251—119)

This invention relates to valves for pumps and has for its object to provide an improved elastic body for such a valve and combine therewith the fastening and mounting means for the valve.

This and other objects of this invention will become more readily apparent from a detailed description thereof which follows, reference being had to the accompanying drawing in which Figure 1 is a partial side elevation and sectional view of a pump cylinder provided with my improved valve.

Figure 2 is a detail sectional view of the end of the pump cylinder illustrating the action of my improved valve.

Figure 3 is a top plan view of the end of the pump cylinder with the valve indicated in dotted lines thereon.

Figure 4 is a horizontal sectional view of the pump cylinder taken on the line 4—4 of Figure 1 and looking in the direction of the arrow.

Figure 5 is a detail side elevation of the valve.

In the several figures of the drawing like reference numerals indicate like parts.

The pump valve forming the subject matter of my present invention is especially adapted for use in sprayers in which the pump is mounted in a tank so that on the operation of the pump the air pressure created thereby will force the liquid contained in the tank in a spray thru the outlet thereof.

As illustrated in the figures the valve comprises a flexible disc 1 which is preferably made of rubber or other flexible material and is normally convexed at the top and flat or even slightly concaved at the bottom. From the center of the bottom of the disc projects a short valve stem 2 which terminates in the head 3 so as to form an annular groove 4 between this head and the under side of the valve disc 1. Both the stem 2 and the head 3 are preferably integral with the valve disc and are therefore made up of the same flexible and resilient material as the disc.

The valve is mounted on the outside of the concaved cylinder head 5 of the pump cylinder 6. In the center of this cylinder head is provided a hole 7 and around this hole are grouped the outlet or port openings 8, 8. The head 3 of the valve 1 is tapered so as to readily center itself over the hole 7 when mounting the valve to the cylinder head. The head 3 is also larger than the hole 7 but due to its taper and its compressibility the head will compress and pass thru the hole when forced therethru. After passing thru the hole 7 the head 3 expands on the inside of the cylinder head while the edge of the whole projects into the annular groove 4 of the valve. This locks the valve to the cylinder.

In mounting the valve, as above described, the head 3 thereof draws the valve disc into the valve seat provided by the concaved cylinder head and flexes the flat or concaved under side of the valve disc into a convex shape to conform to the curvature of the valve seat on the cylinder head. The cylinder head thus forms the seat for the valve disc and due to the flexing of the valve disc in the mounting of it, the tension produced in the flexible material of the valve disc yieldingly holds the under side of the valve disc in place on the concaved seat and closes the port holes 8, 8 provided therein. The original convex top of the valve disc provides the valve with a firm central body portion which yields but little. However the tapered sides of the valve disc gradually increase the flexibility of the outer portion of the disc so that the outside of the valve has a feathering edge.

The valve thus automatically holds its valve disc at a predetermined tension on the valve seat formed by the end of the cylinder head and normally keeps the port openings in the cylinder head closed. As air is forced out of the port holes of the cylinder, the valve disc is raised over the port holes by the pressure of the air to allow the air to escape from under the valve disc as illustrated in Figure 2. The flexibility and resiliency of the material from which the valve is made and the tension under which it is held anchored to the valve seat, will again seat the valve on the cylinder head to close the port openings therein as soon as the air has been forced out of the cylinder. Any pressure of air or liquid in the tank which surrounds the cylinder will of course assist in re-seating the valve and keep the valve seated to hold the port openings 8 closed until forced open by air compressed within the cylinder.

I claim:

1. In a pump valve the combination of a resilient rubber valve disc having a feather edge and a substantially flat bottom, an elastic rubber valve stem at the bottom of said disc integral with said disc, and a compressible rubber head at the end of said valve stem integral therewith, a concave valve seat having a central opening therein and a valve opening eccentric thereto, said elastic rubber valve stem extending thru said central opening to have said rubber head hold said valve disc with its flat bottom flexed into said valve seat to yieldingly close said valve opening.

2. A pump valve member comprising a resilient valve disc having a feather edge with a substantially flat bottom, an elastic rubber valve stem at the bottom of said valve disc, a compressible head at the end of said valve stem having a flat surface opposing the substantially flat bottom of said valve disc and a conical bottom to permit the ready insertion of said head and the compression thereof thru an opening smaller than said head and have the opposing surfaces of said head and valve disc seal the opening around the valve stem.

3. The combination of a concave valve seat, said valve seat having a central opening and a valve port eccentric thereto, a rubber valve disc having a convex back and a normally substantially flat face, and a valve stem anchored in said central opening of said valve seat to convex the normally substantially flat face into said concave valve seat and hold said valve port closed by the pressure exerted by said flexed valve disc.

4. A pump valve for a concaved valve seat having anchoring means and a port opening provided therein to one side of said anchoring means, a rubber valve disc having a convexed back and a normally substantially flat face on the under side thereof, and a valve stem anchored to said anchoring means to hold said normally flat face of said valve disc convexed into said concave valve seat to close the valve port by the pressure exerted by the flexed valve disc.

5. In a pump valve for a concave valve seat having an anchoring hole therethru and a port opening to one side thereof, the combination of a rubber valve disc having a substantially convex top and a substantially flat bottom so as to provide the disc with an edge of increasing flexibility, a flexible valve stem in the center of said flat bottom and a compressible head on the end of said valve stem and spaced from the flat bottom of said valve disc a distance substantially the same as the length of the anchoring hole thru said valve seat so as to cause said head and valve stem to flex said flat bottom of said valve disc into said concave valve seat and exert pressure against the valve port.

6. In combination with a concave valve seat having a port opening and fastening means associated with said valve seat, of a flexible valve disc having a convex back and a normally substantially flat face and fastening means provided on said substantially flat face and anchored to said fastening means of said valve seat to hold said valve disc flexed thereto so as to be held against the concave portion of said valve seat.

7. In a pump valve for a concave valve seat having an anchoring hole therethru and a port opening to one side thereof, the combination of a rubber valve disc having a substantially convex top and a substantially flat bottom so as to provide the disc with an edge of increasing flexibility, a valve stem in the center of said flat bottom of said disc and a head on the end of said valve stem and spaced from the flat bottom of said disc a distance substantially the same as the length of the anchoring hole thru said valve seat so as to cause said head and valve stem to flex said flat bottom of said valve disc into said concave valve seat and exert pressure against the valve port.

COLIN BROWN.